(12) United States Patent
Kroese et al.

(10) Patent No.: US 8,602,137 B2
(45) Date of Patent: Dec. 10, 2013

(54) LINKAGE LIFT MECHANISM FOR OFF-ROAD VEHICLE

(75) Inventors: Glen D. Kroese, Jackson, MN (US); Brian T. Coulter, Sherburn, MN (US); Adam Thurmer, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/330,908

(22) Filed: Dec. 20, 2011

(65) Prior Publication Data

US 2012/0318588 A1 Dec. 20, 2012

Related U.S. Application Data

(60) Provisional application No. 61/428,264, filed on Dec. 30, 2010.

(51) Int. Cl.
*B60S 9/02* (2006.01)

(52) U.S. Cl.
USPC .................. 180/41; 280/6.155; 280/6.157

(58) Field of Classification Search
USPC ........ 180/8.3, 8.5, 900, 41; 280/6.154, 6.155, 280/6.157
See application file for complete search history.

(56) References Cited

U.S. PATENT DOCUMENTS

| | | | |
|---|---|---|---|
| 4,186,815 A | | 2/1980 | Hart |
| 4,241,803 A | * | 12/1980 | Lauber .......................... 180/8.1 |
| 4,534,575 A | * | 8/1985 | Grove et al. ............ 280/124.136 |
| 5,039,129 A | * | 8/1991 | Balmer ........................ 180/308 |
| 5,580,089 A | * | 12/1996 | Kolka ..................... 280/124.103 |
| 5,755,382 A | * | 5/1998 | Skotinkov ..................... 239/161 |
| 6,036,201 A | * | 3/2000 | Pond et al. ................. 280/5.514 |
| 6,257,361 B1 | * | 7/2001 | Dickson ........................ 180/198 |
| 6,267,198 B1 | * | 7/2001 | Hurlburt et al. ............... 180/414 |
| 6,406,043 B1 | * | 6/2002 | Balmer ........................ 280/124.1 |
| 7,837,207 B2 | * | 11/2010 | Kremmin et al. .......... 280/43.22 |
| 8,042,817 B2 | * | 10/2011 | Motebennur et al. ...... 280/5.514 |
| 8,376,078 B2 | * | 2/2013 | Hiddema ...................... 180/209 |

FOREIGN PATENT DOCUMENTS

| | | |
|---|---|---|
| EP | 1 001 088 A2 | 5/2000 |
| EP | 2 058 154 A1 | 5/2009 |
| EP | 2 248 690 A2 | 11/2010 |
| WO | WO 89/00928 | 2/1989 |
| WO | WO 99/42311 | 8/1999 |

OTHER PUBLICATIONS

International Search Report dated Mar. 23, 2012 Application No. PCT/US2011/066005, 14 pgs.

\* cited by examiner

*Primary Examiner* — Joseph Rocca
*Assistant Examiner* — Timothy Wilhelm

(57) ABSTRACT

A self-propelled implement may include a suspension arrangement with a suspension spring, an elevation toggling linkage, and a wheel. The suspension spring may support a main frame of the self-propelled implement at a sprung end. The elevation toggling linkage may be mounted at an unsprung end of the suspension spring. The elevation toggling linkage may be used to configure the self-propelled implement at a raised elevation or a lowered elevation.

17 Claims, 8 Drawing Sheets

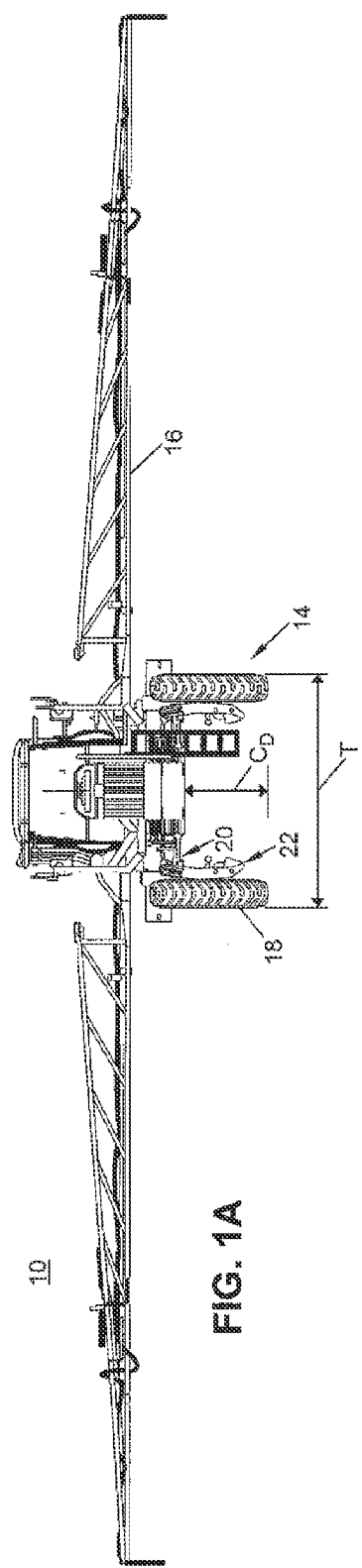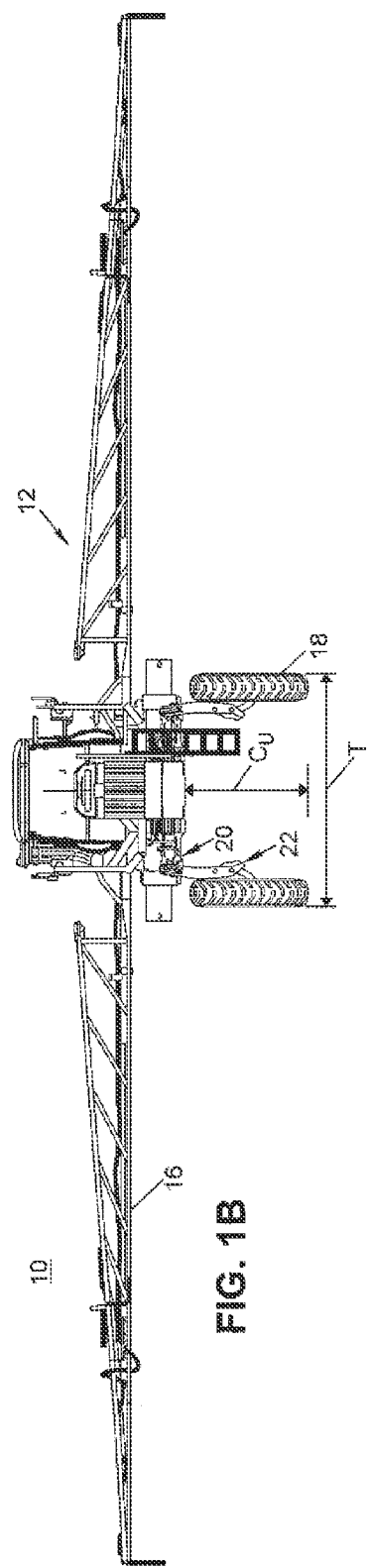
FIG. 1A
FIG. 1B

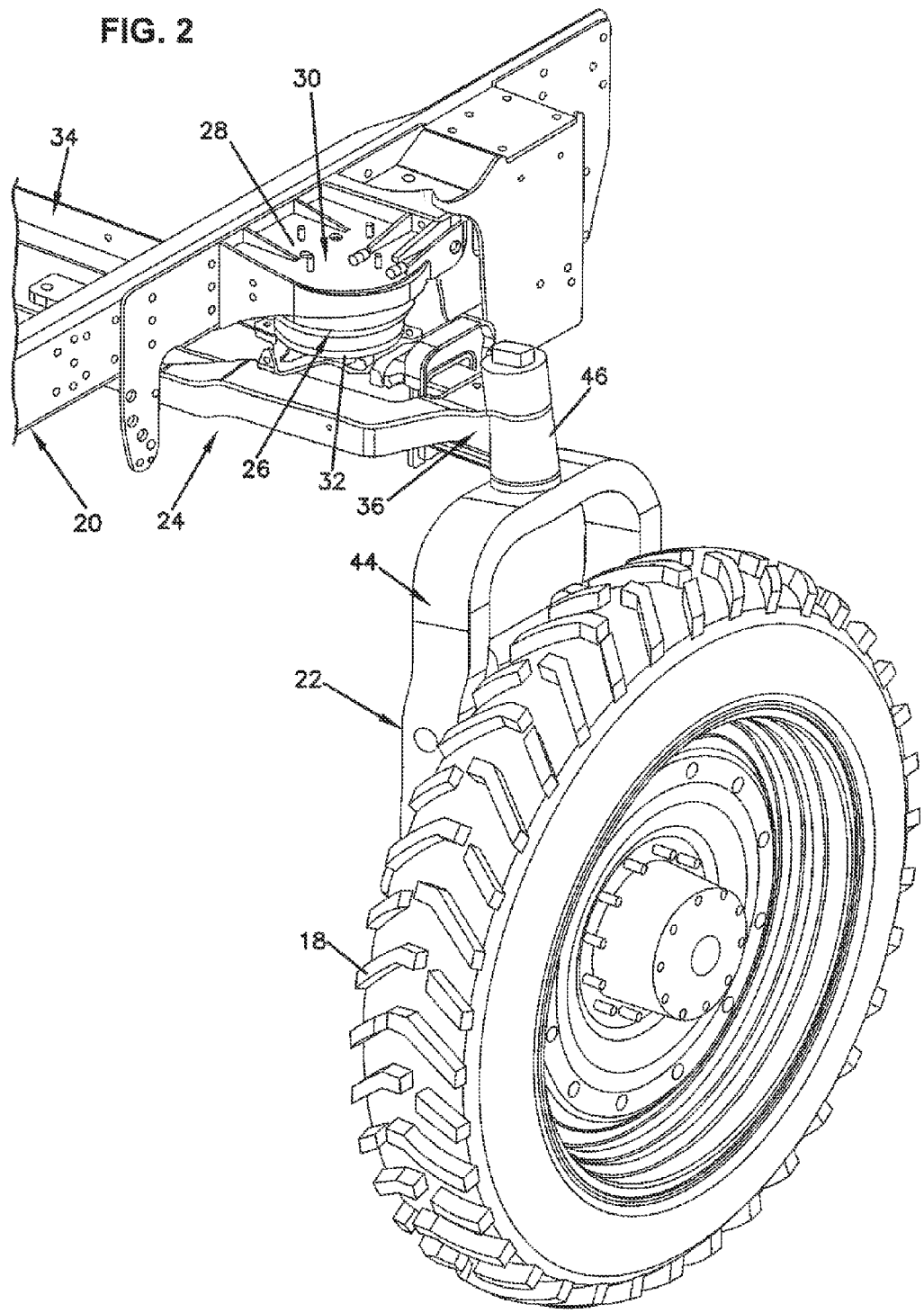

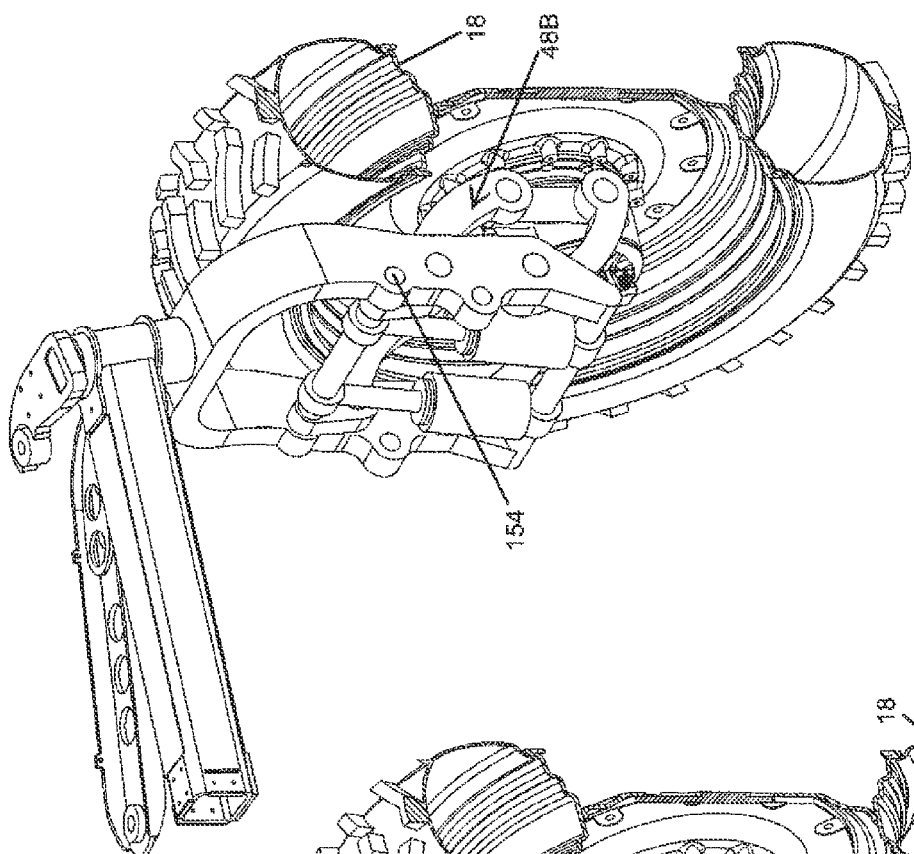
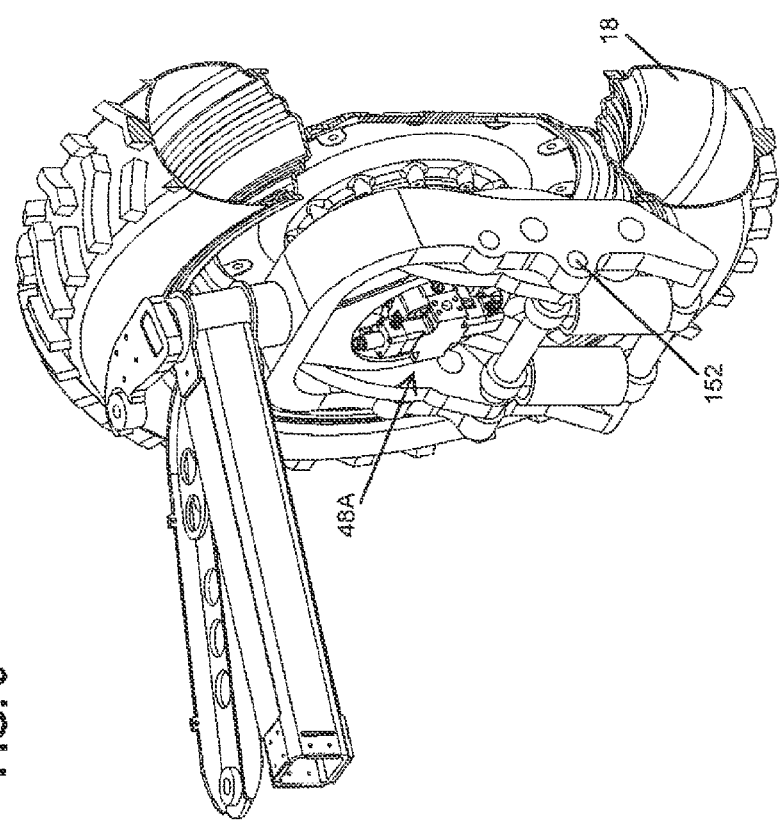
FIG. 9
FIG. 10

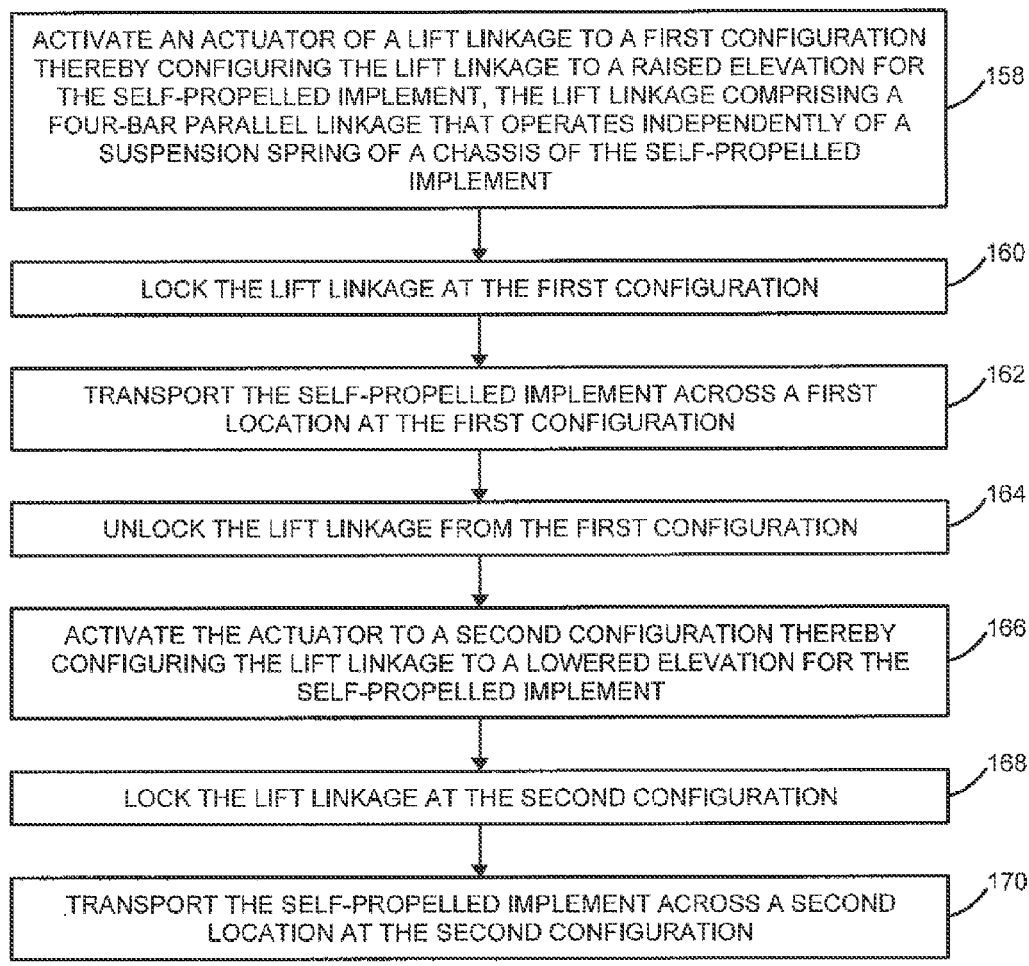

LINKAGE LIFT MECHANISM FOR OFF-ROAD VEHICLE

RELATED APPLICATION

Under provisions of 35 U.S.C. §119(e), Applicants claim the benefit of U.S. provisional application No. 61/428,264, filed Dec. 30, 2010, which is incorporated herein by reference.

BACKGROUND

Self-propelled implements that include variable height suspension arrangements incorporated with the suspension are presently known. The suspension arrangements are adapted to lift and lower the self-propelled implement. By raising and lowering the self-propelled implement, the self-propelled implement can clear crops such as row-crops when mature or nearly mature.

SUMMARY

A self-propelled implement may include a suspension arrangement with a suspension spring, an elevation toggling linkage, and a wheel. The suspension spring may support a main frame of the self-propelled implement at a sprung end. The elevation toggling linkage may be mounted at an unsprung end of the suspension spring. The elevation toggling linkage may be used to configure the self-propelled implement at a raised elevation or a lowered elevation.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout several views.

FIG. 1A is a front elevation view of an example self-propelled farm implement configured in a low ground clearance configuration, the self-propelled farm implement providing an environment in which an embodiment of a linkage lift mechanism may be employed.

FIG. 1B is a front elevation view of an example self-propelled farm implement configured in a high ground clearance configuration, the self-propelled farm implement providing an environment in which an embodiment of a linkage lift mechanism may be employed.

FIG. 2 is a partial perspective view of a suspension arrangement of a self-propelled farm implement and a portion of an embodiment of a linkage lift mechanism connected to the suspension arrangement.

FIGS. 9-10 are partial perspective views of example embodiments of lift linkage mechanisms with respective locking arrangements.

FIG. 11 is flow diagram that illustrates a method embodiment.

DETAILED DESCRIPTION

Figure 3:
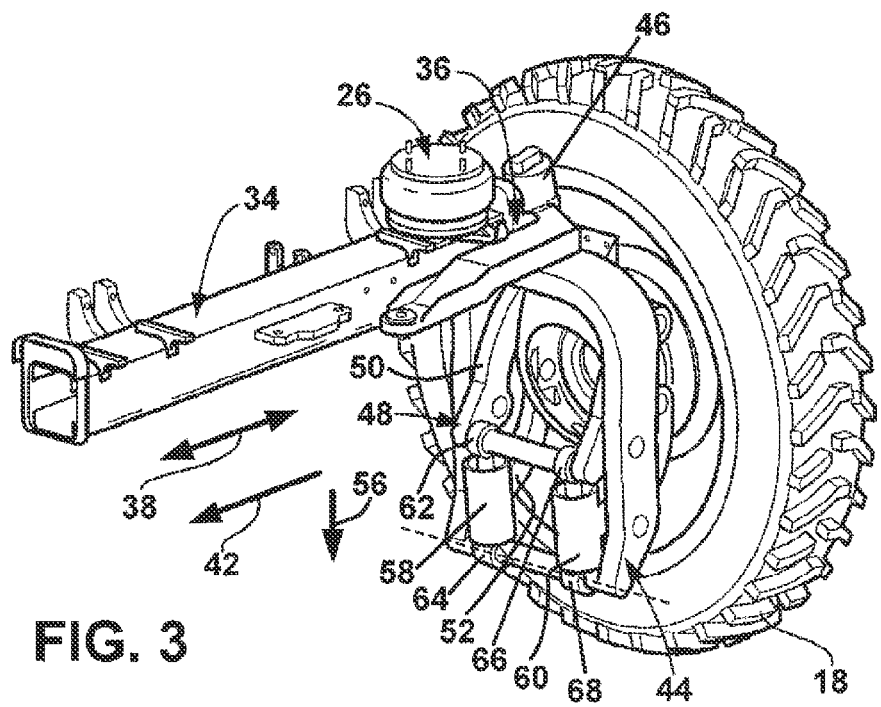
FIG. 3 is a partial perspective view of a suspension arrangement including a telescoping axle of a self-propelled farm implement and an embodiment of a linkage lift mechanism connected to the suspension arrangement, the telescoping axle shown in a retracted configuration and the linkage lift mechanism shown configured in a lowered configuration.

Certain apparatus, system, and method embodiments of a linkage lift mechanism are disclosed. The linkage lift mechanism is incorporated in a vehicle (e.g., off-road vehicle), and raises and lowers an off-road vehicle, such as to increase clearance. In one embodiment, the linkage lift mechanism comprises parallel linkages that are hydraulically actuated. The parallel linkages confine the movement of a wheel of the off-road vehicle to the same orientation to the machine during height transition (during the raising and lowering of the vehicle), and said wheel moves side-to-side relative to the ground during said height transition. The linkage lift mechanism enables the off-road vehicle to travel in both upper and lower positions. In some embodiments, the linkage lift mechanism comprises a locking mechanism that locks the parallel linkages at either position, such as to prevent a change in clearance and/or to support loads. Variations to certain embodiments of the linkage lift mechanism are contemplated that enable a vehicle to maintain track width or to maintain scrub radius at both upper and lower positions.

Some conventional systems enable a raising and lowering of the off-road vehicle, but have limited range of travel (e.g., the range corresponding to the raising and lowering of the vehicle, or vehicle lift), and/or the conventional mechanisms to enable the lift are integrated with the suspension (e.g., incorporate the suspension actuator). Embodiments of the linkage lift mechanism are separate from the suspension, and provide for increased range of motion. Certain embodiments of the linkage lift mechanism may improve the ability of an off-road vehicle to pass under overhead obstacles (e.g., fit through a door of an implement shed), enable better road handling, enable an efficient transition between handling both mature and/or tall crops and less mature and/or shorter crops, and/or improve operator visibility (e.g., when in the raised configuration).

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and any methods described herein may be modified by substituting, reordering, or adding stages to the methods. References hereinafter made to certain directions, such as, for example, "front", "rear", "left" and "right", are made as viewed from the rear of the vehicle looking forwardly.

As illustrated at FIGS. 1A and 1B, a self-propelled farm implement 10 with a high ground clearance configuration 12 (see FIG. 1B) and a low ground clearance configuration 14 (see FIG. 1A) is disclosed. It should be understood by one having ordinary skill in the art, in the context of the present disclosure, that the example components illustrated in FIGS. 1A and 1B are merely illustrative, and should not be construed as implying any limitations upon the scope of the disclosure. For instance, though described in association with a self-propelled farm implement 10, certain embodiments of a linkage lift mechanism may be employed in pull-type implements, among other vehicles. The self-propelled farm implement 10 may comprise a work tool 16 and engage the ground with plural wheels, such as wheel 18. As depicted, the self-propelled farm implement 10 may comprise a sprayer and the work tool 16 may comprise a pair of foldable spray booms. Further, the self-propelled farm implement 10 comprises a main frame 20 connected to a linkage lift mechanism 22 through a suspension arrangement, the latter enabling configuration of the tracking width, T (the suspension arrangement and tracking width configuration explained below).

When the linkage lift mechanism 22 enables the self-propelled farm implement 10 to be configured in the high ground clearance configuration 12, a high ground clearance $C_U$ may be defined (e.g., approximately 76 inches, though other dimensions are contemplated and merely listed here for illustrative purposes). When the linkage lift mechanism 22 enables the self-propelled farm implement 10 to be configured in the low ground clearance configuration 14, a low ground clearance $C_D$ may be defined (e.g., approximately 50 inches, though other dimensions are contemplated and merely listed here for illustrative purposes).

FIG. 2 provides a perspective view of a composite assembly comprising the main frame 20, a suspension arrangement 24 connected to the main frame 20, the linkage lift mechanism 22 connected to the suspension arrangement 24 and to a hub of the wheel 18. As shown in the depicted embodiment, the suspension arrangement 24, linkage lift mechanism 22, the wheel hub (interior-side obscured from view), and the wheel 18 may exist in a related (wheel) group (e.g., a right-front group, a left-front group, a right-rear group, a left-rear group, etc.). The related group may be repeated thereby providing a plurality of related groups on the self-propelled farm implement 10 (e.g., front left wheel group, front right wheel group, etc.). The plurality of the related groups may be identical to each other in some embodiments, or may be similar but different from each other in some embodiments. The plurality of the related groups may be connected to the mainframe 20 at a plurality of locations on the mainframe 20. The plurality of the related groups may operate independently from each other, in coordination with each other (e.g., controlled by a common control system), and/or linked with each other (e.g., linked via a mechanical linkage). Hereinafter, the present disclosure will generally discuss one of the related groups, with the understanding that the same or similar description applies to the other groups.

Directing attention initially to the suspension arrangement 24, the suspension arrangement 24 may include a suspension spring 26 mounted to a suspension spring mount 28 of the main frame 20. The suspension spring 26 includes a top end 30 and a bottom end 32. In one embodiment, the suspension spring 26 may be a pneumatic spring. In some embodiments, the suspension spring 26 may be a leaf spring, a coil spring, a torsion spring, and/or other spring or compliant component known in the art. As depicted, the suspension spring 26 may be mounted at the top end 30 to the suspension spring mount 28 of the main frame 20. Components of the self-propelled farm implement 10 mounted on the top end 30 of the suspension spring 26 may be sprung components of the self-propelled farm implement 100, and components of the self-propelled farm implement 100 mounted on the bottom end 32 of the suspension spring 26 may be unsprung components of the self-propelled farm implement 100. As depicted, the suspension arrangement 24 may include a main axle 34 that may be mounted to the suspension spring 26 at the bottom end 32. The main axle 34 may support the main frame 20 via the suspension spring 26. The main axle 34 and the main frame 20 may be isolated from each other by the suspension spring 26.

Figure 4:
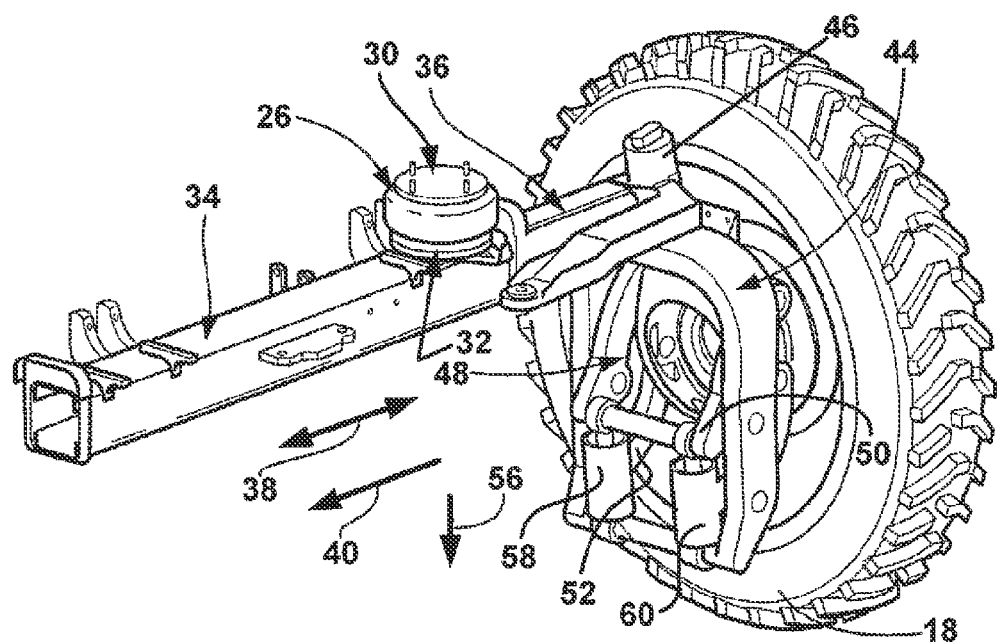
FIG. 4 is a partial perspective view of a suspension arrangement including a telescoping axle of a self-propelled farm implement and an embodiment of a linkage lift mechanism connected to the suspension arrangement, the telescoping axle shown in an extended configuration and the linkage lift mechanism configured in a lowered configuration.
Figure 5:
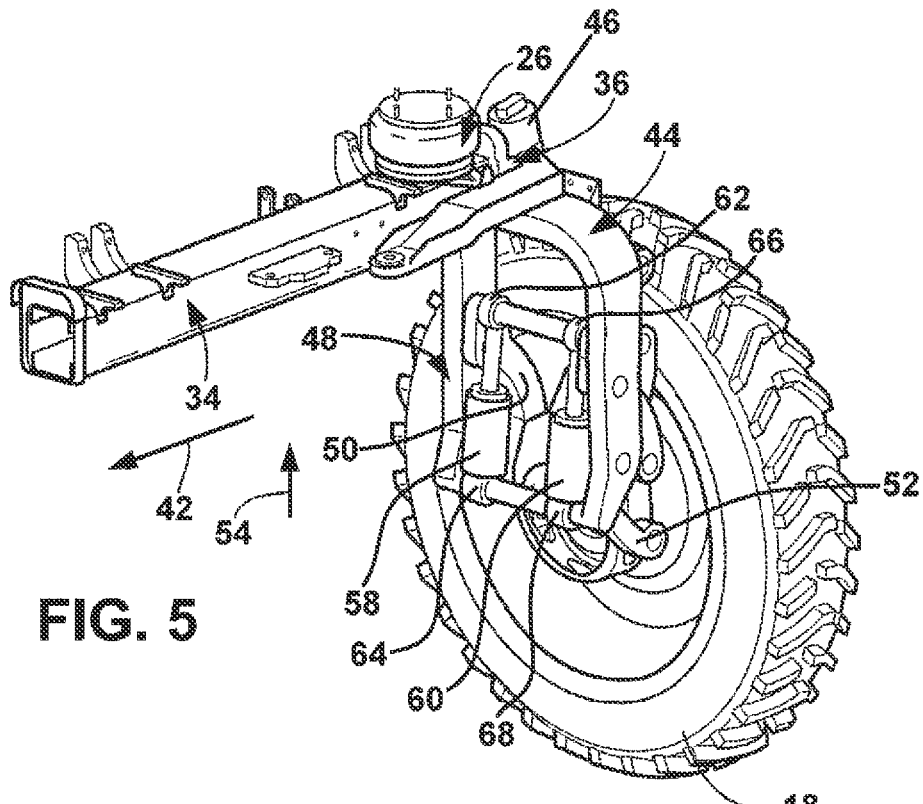
FIG. 5 is a partial perspective view of a suspension arrangement including a telescoping axle of a self-propelled farm implement and an embodiment of a linkage lift mechanism connected to the suspension arrangement, the telescoping axle shown in a retracted configuration and the linkage lift mechanism configured in a raised configuration.
Figure 6:
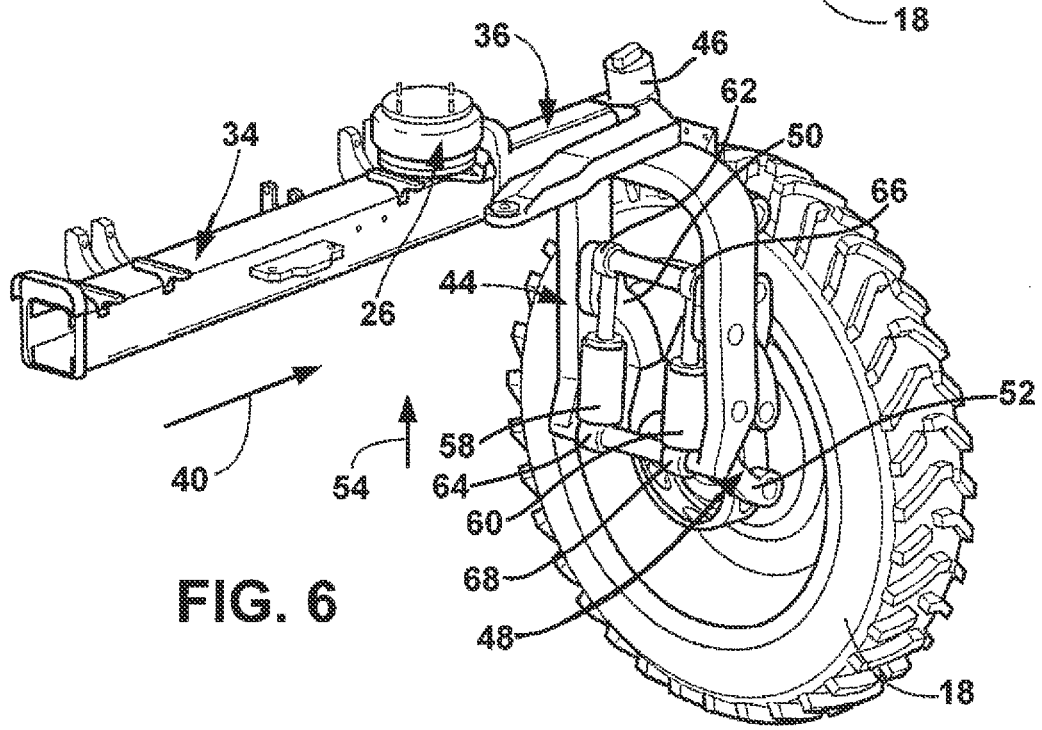
FIG. 6 is a partial perspective view of a suspension arrangement including a telescoping axle of a self-propelled farm implement and an embodiment of a linkage lift mechanism connected to the suspension arrangement, the telescoping axle shown in an extended configuration and the linkage lift mechanism configured in the raised configuration.

With continued reference to FIG. 2, and referring to FIGS. 3-6 for further explanation, the suspension arrangement 24 may include an extendable axle 36 telescopingly mounted to the main axle 34. In some embodiments, the extendable axle 36 may support the main axle 34. The extendable axle 36 may thereby move in a lateral direction 38 relative to the main axle 34. By extending (see outward movement 40 at FIG. 4) and/or retracting (see inward movement 42 at FIG. 3) the extendable axle 36 in one or more of the related groups, a tracking width T (e.g., a width occupied between laterally opposing wheels 18, as shown in FIG. 1) of the self-propelled farm implement 10 may be varied and selected. For instance, the ability to vary and select the tracking width T may be useful when matching the self-propelled farm implement 10 to various row crops. FIGS. 3 and 5 illustrate the extendable axle 36 in a retracted configuration between raising and lowering, and FIGS. 4 and 6 illustrate the extendable axle 36 in an extended configuration between raising and lowering. As indicated above, the extendable axle 36 may telescopingly adjust to effect varying the tracking width T between a pair of the wheels 18 of the self-propelled farm implement 10. The pair of wheels 18 may include one wheel from a right-hand related group (e.g., the right-front group) and one wheel from a left-hand related group (e.g., the left-front group).

In some embodiments, the self-propelled farm implement 10 may not include the extendable axle 36. In some embodiments, the extendable axle 36 may use means other than telescoping to extend and retract. In some embodiments, the extendable axle 36 may use means other than telescoping to switch between the retracted configuration and the extended configuration. In some embodiments, the self-propelled farm implement 10 may vary the tracking width T without using the extendable axle 36.

The linkage lift mechanism 22 comprises a yoke 44, the yoke comprising a kingpin 46 located on the top of the yoke 44. It should be appreciated within the context of the present disclosure that some embodiments of the linkage lift mechanism 22 may include fewer or a greater number of components than those depicted in FIGS. 2-6. For instance, in some embodiments, the yoke 44 (or other components) may not be considered a part of the linkage lift mechanism 22, or in some embodiments, additional components may be considered as a part of the linkage lift mechanism 22. The linkage lift mechanism 22 further comprises a lift linkage 48 comprising an upper linkage 50 and a lower linkage 52. The yoke 44 serves to control steering (e.g., through the kingpin 46, as explained below), support (at least partially) the weight of the implement 10, and anchor the upper 50 and lower 52 linkages. The lift linkage 48 may lift (see direction 54 at FIGS. 5-6) the self-propelled farm implement 10 from the low ground clearance configuration 14 to the high ground clearance configuration 12. The lift linkage 48 may lower (see direction 56 at FIGS. 3-4) the self-propelled farm implement 10 from the high ground clearance configuration 12 to the low ground clearance configuration 14. The lift linkage 48 may comprise one or more actuators (two are illustrated in FIGS. 3-6) 58 and 60. Actuator 58 comprises upper 62 and lower 64 connections, and actuator 60 comprises upper 66 and lower 68 connections.

In one embodiment, the actuators 58, 60 may each comprise a hydraulic cylinder (e.g., with a main body and rod or piston assembly, as is known). In some embodiments, the actuators 58, 60 may comprise various types of actuators including linear and rotary actuators. In some embodiments, the actuators 58, 60 may comprise hydraulic, electric, and/or other types of actuators. As shown in FIGS. 5-6, the actuators 58, 60 may be adapted to raise an elevation of the lift linkage 48 to a raised elevation and thereby configure the self-propelled farm implement 10 in the high ground clearance configuration 12. As shown in FIGS. 3-4, the actuators 58, 60 may be adapted to lower the elevation of the lift linkage 48 to a lowered elevation and thereby configure the self-propelled farm implement 10 in the low ground clearance configuration 14.

Figure 7:
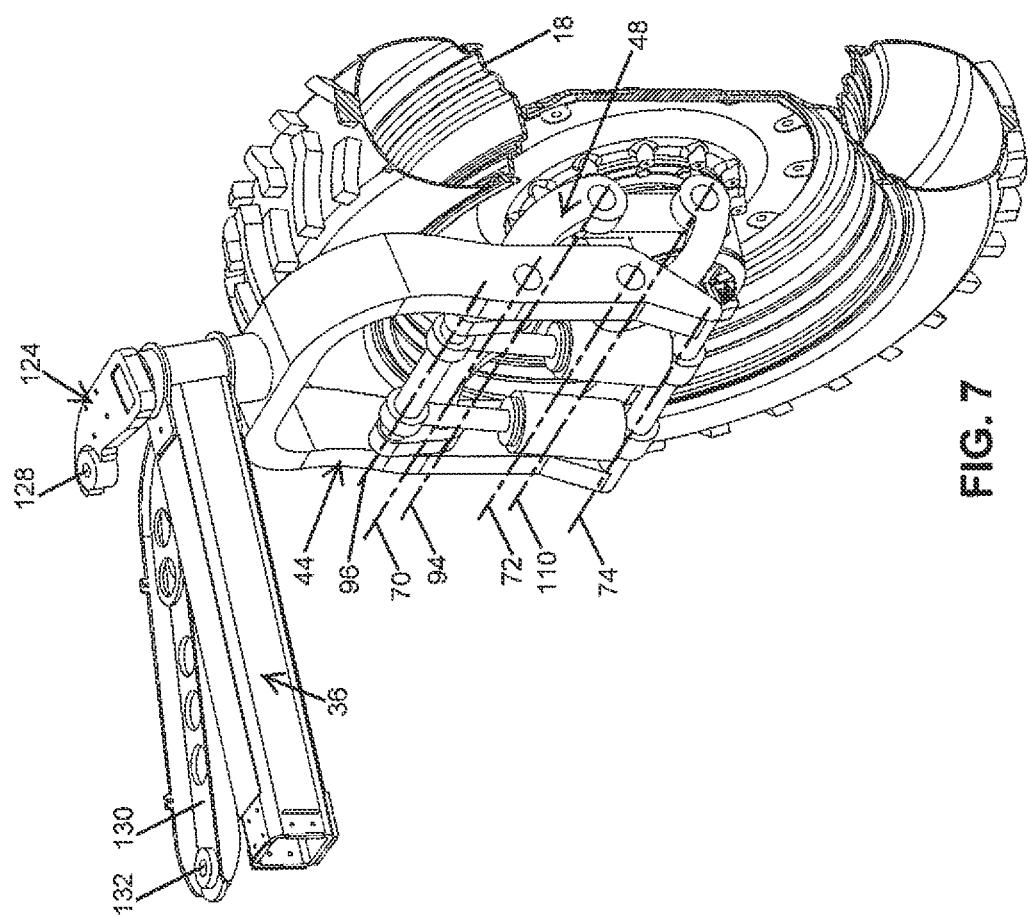
FIG. 7 is a partial perspective view that shows an embodiment of a linkage lift mechanism coupled to a steering arrangement and a wheel assembly.

As best depicted in FIG. 7, the lift linkage 48 may comprise a four bar linkage. As depicted, the four bar linkage may be a planar linkage. In some embodiments, the lift linkage 48 may be a non-planar linkage. An elevation changing link of the four bar linkage is defined by an axis 70 and axis 72. The axis 70, the axis 72, and an axis 74 of the yoke 44 may define an idealized triangle when viewed directly from the front of the implement 10. In certain embodiments, the axes 70, 72, and 74 may be coplanar and may thereby define an idealized line when viewed directly from the front of the implement 10. With continued reference to FIG. 7, and as best viewed from FIG. 8, the axis 70 may be defined by a pivot 76, and the axis 72 may be defined by a pivot 78. The pivots 76, 78 may be respectively defined by bores 80, 82 and bores 84, 86 in the yoke 44. The axis 74 may be defined by a pivot 88 that may be defined by cylindrical member 90.

Figure 8:
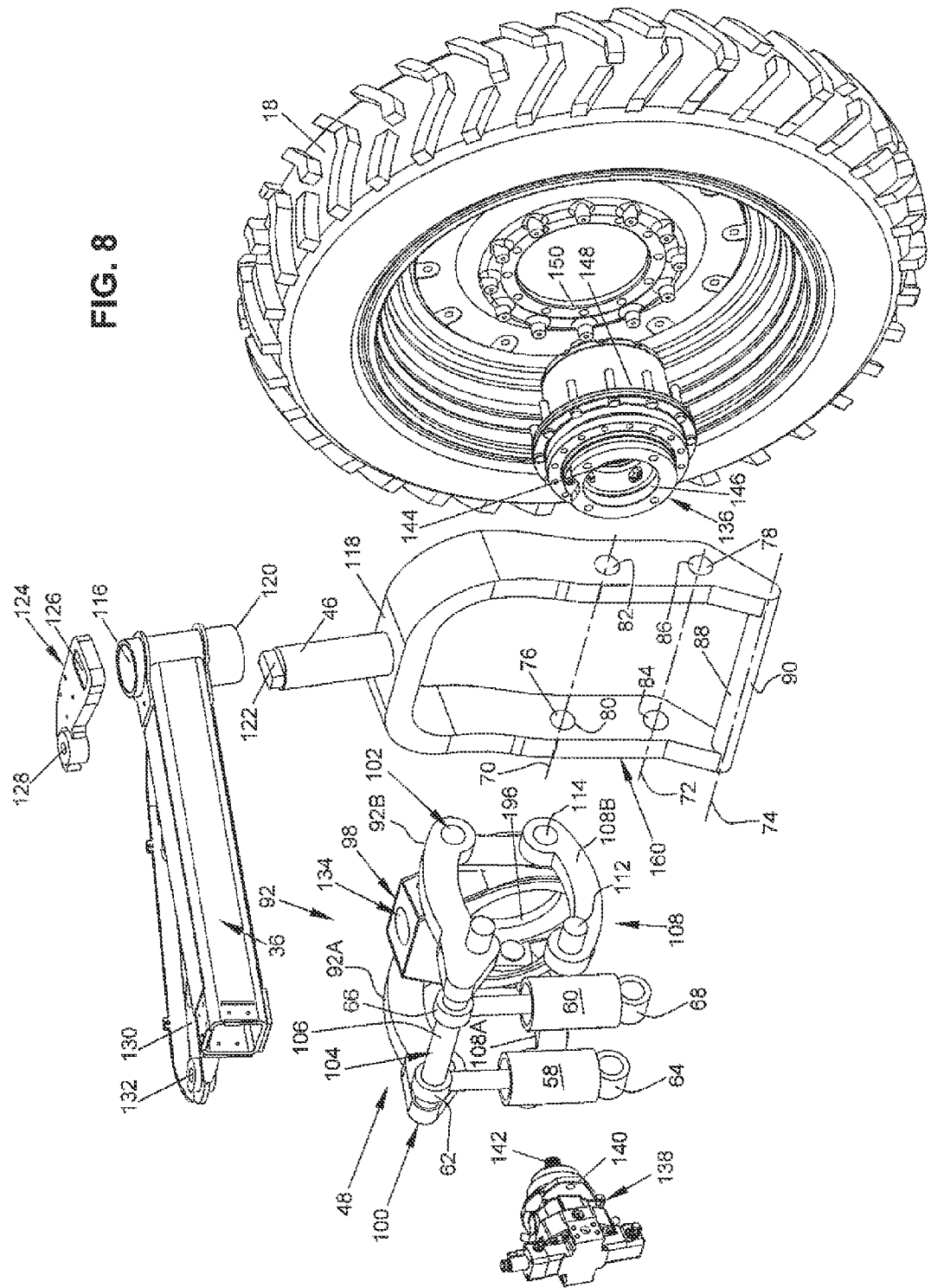
FIG. 8 is a partial perspective, exploded view that shows cooperating elements of a steering arrangement, an embodiment of a linkage lift mechanism, and a wheel assembly.

Continuing with reference to FIGS. 7-8, the four bar linkage of the lift linkage 48 may comprise a connecting link 92 (shown as comprising arms 92A and 92B) rotatably mounted to the yoke 44 about the axis 70. The connecting link 92 may comprise the axis 70, and axes 94 and 96. A wheel mount 98 may be rotatably mounted to the connecting link 92 about the axis 94. The axis 70, the axis 94, and the axis 96 of the connecting link 92 may define an idealized triangle when viewed from the front of the implement 10. In some embodiments, the axes 70, 94, and 96 may be coplanar and may thereby define an idealized line when viewed from the front of the implement 10. The connections 62, 66 may be attached to the connecting link 92 of the lift linkage 48.

The axis 70 may be defined by a pivot 100, and the axis 94 may be defined by a pivot 102. The pivots 100, 102 may be respectively defined by corresponding bores (obscured from view) in connecting link 92. The axis 96 may be defined by a pivot 104 that may be defined by a cylindrical member 106. The connecting link 92 may comprise an arm 92A spaced from an arm 92B. The arms 92A, 92B may be parallel to each other. The arms 92A, 92B may be connected by a shaft that comprises the cylindrical member 106.

The four bar linkage of the lift linkage 48 may comprise a connecting link 108 (shown in FIG. 8 as comprising arms 108A and 108B) rotatably mounted to the yoke 44 about the axis 72. The connecting link 108 may also comprise the axis 72 and the axis 110 (see FIG. 6). The wheel mount 98 may be rotatably mounted to the connecting link 108 about the axis 110. The axis 72 and the axis 110 of the connecting link 108 may define an idealized line when viewed from the front of the implement 10. In some embodiments, the axes 72 and 110 may be coplanar. The axis 72 may be defined by a pivot 112, and the axis 110 may be defined by a pivot 114. The pivots 112, 114 may be respectively defined by corresponding bores (obscured from view in FIG. 8) in the connecting link 108. The connecting link 108 may comprise an arm 108A spaced from an arm 108B. The arms 108A, 108B may be parallel to each other. The arms 108A, 108B may be connected or may be separate from each other.

The four bar linkage of the lift linkage 48 may be defined by the axes 70, 94, 72, and 110. The four bar linkage of the lift linkage 48 may be controlled by the actuators 58, 60. The connections 64, 68 of the actuators 58, 60 may be rotatably mounted about the axis 74, and the connections 62, 66 of the actuators 58, 60 may be rotatably mounted about the axis 96. A rotary actuator(s) may be connected between any of the components of the lift linkage 84 in place of or in addition to the depicted actuators 58, 60.

The connecting link 92 may maintain a first spacing between the axis 70 and the axis 94, and/or the connecting link 108 may maintain a second spacing between the axis 72 and the axis 110. The first and the second spacings may be substantially equal.

The connecting link 92 and the connecting link 108 may nest with each other when the elevation changing link of the lift linkage 48 is at the raised elevation. The connecting link 92 and the connecting link 108 may nest with each other when the elevation changing link of the lift linkage 48 is at the lowered elevation. The connecting link 92 and the connecting link 108 may nest with each other when the self-propelled farm implement 10 is positioned in the high ground clearance configuration 12. The connecting link 92 and the connecting link 108 may nest with each other when the self-propelled farm implement 10 is positioned in the low ground clearance configuration 14. By nesting, a portion of the connecting link 108 may be positioned between the axis 70 and the axis 94 of the connecting link 92, and/or a portion of the connecting link 92 may be positioned between the axis 72 and the axis 110 of the connecting link 108.

Note that the four bar linkage (e.g., joints along axes 70, 94, 72, 110) of the lift linkage 84 may be held together by pins.

Referring again to FIG. 8, attention is directed to a steering mechanism and how the linkage lift mechanism 22 interacts with the wheel assembly. As indicated above, the kingpin 46 may be rotatably mounted to a kingpin mount 116. The kingpin 46 and/or the yoke 44 may comprise a bearing surface 118 that bears against a bearing surface 120 of the axle 36 and thereby supports the axle 36. The kingpin 46 and/or the yoke 44 may comprise a steering arm mount 122. The yoke 44 may comprise an axis 70, an axis 72, and an axis 74. As depicted, the axes 70, 72, and 74 may be parallel with each other. In certain embodiments, the yoke 44 may not steer. The same self-propelled farm implement 10 may include both steering-capable and non-steering capable yokes 44 (e.g., the steering-capable yoke 44 may be included in the right-front group and the left-front group and the non-steering capable yoke 44 may be included in the right-rear group and the left-rear group, among other variations). In certain embodiments, the self-propelled farm implement 10 may include all steering-capable yokes 44 and none of the non-steering capable yokes 44.

In certain embodiments, a steering arm 124 may be attached to the yoke 44. The steering arm 124 may comprise a yoke mount 126 and/or an actuator mount 128. As depicted, the yoke mount 126 may be mounted to the steering arm mount 122. The axle 36 may comprise a steering actuator mount arm 130 with a steering actuator attachment 132. A steering actuator may be mounted between the actuator mount 128 and the steering actuator attachment 132. The steering actuator may comprise a hydraulic cylinder, with one end connected to the steering actuator attachment 132 and the other end connected to the actuator mount 128. As the steering actuator mount arm 130 and the steering actuator attachment 132 may travel with the extendable axle 36, a steering function of the self-propelled farm implement 10 may be independent of a tracking width T adjusting function.

Referring to the wheel mount 98, and with continued reference to FIGS. 7-8, the wheel mount 98 may comprise a base link (e.g., a ground link) of the four bar linkage by defining an axis 94 and an axis 110. The axis 94 and the axis 110 of the wheel mount 98 may define an idealized line when viewed from the front of the implement 10. In certain embodiments, the axes 94 and 110 may be coplanar. The axis 94 may be defined by a pivot 134, and the axis 110 may be defined by a pivot (not shown) located on each side of the mount 98. The pivots 134 (and the other not shown) may be respectively defined by bores in the wheel mount 98.

A wheel hub 136 is depicted in FIG. 8, and comprises a geared wheel hub (e.g., a planetary wheel hub) that may be powered by a hydrostatic motor 138. The hydrostatic motor 138 may comprise a motor mount 140 and/or an output 142. The output 142 may be rotationally connected to an input 144 of the wheel hub 136. The motor mount 140 may be mounted to a motor mount 146 of the wheel hub 136. A wheel mount 148 may be defined by the wheel hub 136, and a wheel mount 150 of the wheel 18 may be mounted thereon.

As depicted at FIGS. 9-10, certain embodiments of a lift linkage 48A and 48B, respectively, may comprise a lock 152 and/or a lock 154. In particular, and referring to FIG. 10, the lock 154 locks the lift linkage 48B and thereby locks the self-propelled farm implement 10 at the high ground clearance configuration 12. Referring to FIG. 9, the lock 152 locks the lift linkage 48A and thereby locks the self-propelled farm implement 10 at the low ground clearance configuration 14. The locks 152, 154 of the lift linkages 48A, 48B may comprise a pin. If certain rotary actuators are used, the locks 152, 154 may not be needed to lock the self-propelled farm implement 10 at the high, low ground clearance configurations 12, 14. Instead, the rotary actuator may inherently provide a locking function. All other features shown in FIGS. 9-10 are similar to those shown in the preceding figures, and hence discussion of the same is omitted for brevity.

The present disclosure also includes an embodiment of a method 156 for selecting an elevation of the self-propelled implement 10, as shown in FIG. 11. The method 156 comprises activating an actuator of a lift linkage to a first configuration thereby configuring the lift linkage to a raised elevation for the self-propelled implement, the lift linkage comprising a four-bar parallel linkage that operates independently of a suspension spring of a chassis of the self-propelled implement (158); locking the lift linkage at the first configuration (160); transporting the self-propelled implement across a first location at the first configuration (162); unlocking the lift linkage from the first configuration (164); activating the actuator to a second configuration thereby configuring the lift linkage to a lowered elevation for the self-propelled implement (166); locking the lift linkage at the second configuration (168); and transporting the self-propelled implement across a second location at the second configuration (170).

It should be emphasized that the above-described embodiments of the present disclosure are merely possible examples of implementations, merely set forth for a clear understanding of the principles of the linkage lift mechanisms. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A self-propelled farm implement comprising:
   a main frame of the self-propelled farm implement comprising a suspension spring mount;
   a suspension spring mounted to the suspension spring mount;
   an axle mounted to the suspension spring, the axle supporting the main frame via the suspension spring, the main axle and the main frame isolated from each other by the suspension spring;
   a wheel mount that operably couples a motor to a wheel and hub assembly; and
   a linkage lift mechanism, the linkage lift mechanism comprising:
   a yoke connected to the axle yet operably independent of the suspension spring; and
   a lift linkage pivotably connected to the yoke and rotatably coupled to the wheel mount, the lift linkage comprising an actuator, an upper linkage, and a lower linkage, the actuator configured to concurrently move the upper and lower linkages to a first extreme position corresponding to a high ground clearance configuration of the self-propelled farm implement and a second extreme position corresponding to a low ground clearance configuration of the self-propelled farm implement.

2. The self-propelled farm implement of claim 1, wherein the lift linkage further comprises a first lock that locks the lift linkage and thereby locks the self-propelled farm implement at the high ground clearance configuration.

3. The self-propelled farm implement of claim 2, wherein the lift linkage further comprises a second lock that locks the lift linkage and thereby locks the self-propelled farm implement at the low ground clearance configuration.

4. The self-propelled farm implement of claim 3, wherein the locks of the lift linkage comprise a pin.

5. The self-propelled farm implement of claim 1, wherein the actuator comprises a hydraulic cylinder.

6. The self-propelled farm implement of claim 1, wherein the actuator comprises a pair of hydraulic cylinders.

7. The self-propelled farm implement of claim 1, wherein the suspension spring comprises a pneumatic spring.

8. The self-propelled farm implement of claim 1, wherein a wheel hub of the wheel and hub assembly comprises a geared wheel hub powered by a hydrostatic motor.

9. The self-propelled farm implement of claim 1, wherein the lift linkage further comprises rotary actuator that locks the lift linkage and thereby locks the self-propelled farm implement at either a high ground clearance configuration or a low ground clearance configuration.

10. The self-propelled farm implement of claim 1, wherein the actuator comprises an electric actuator.

11. The self-propelled farm implement of claim 1, wherein the actuator comprises a rotary actuator.

12. An elevation toggling linkage for a self-propelled farm implement, the elevation toggling linkage adapted for toggling the self-propelled farm implement between a low ground clearance configuration and a high ground clearance configuration, the elevation toggling linkage comprising:
- an elevation changing link comprising a first axis and a second axis, the elevation changing link comprised by a suspension arrangement connected to a main frame of the self-propelled farm implement, wherein the suspension arrangement comprises a suspension spring mounted to a suspension spring mount of the main frame, the suspension spring also mounted to an axle, of the self-propelled farm implement and thereby isolating the main frame from the axle, and wherein the axle is mounted to the elevation changing link;
- a ground link comprising a third axis and a fourth axis, the ground link comprised by a wheel hub mount connected to a wheel hub of the self-propelled farm implement;
- a first connecting link rotatably mounted to the elevation changing link about the first axis and the ground link about the third axis;
- a second connecting link rotatably mounted to the elevation changing link about the second axis and the ground link about the fourth axis;
- the elevation changing link, the ground link, the first connecting link, and the second connecting link comprised by a four-bar linkage of the elevation toggling linkage;
- an actuator transformable between a first configuration and a second configuration, the actuator operably connected to the four-bar linkage, the actuator adapted to raise an elevation of the elevation changing link to a raised elevation and thereby configure the self-propelled farm implement in the high ground clearance configuration when the actuator is transformed from the second configuration to the first configuration and the actuator adapted to lower the elevation of the elevation changing link to a lowered elevation and thereby configure the self-propelled farm implement in the low ground clearance configuration when the actuator is transformed from the first configuration to the second configuration.

13. The elevation toggling linkage of claim 12, wherein the elevation changing link is rotatably mounted to the axle and comprises a yoke.

14. The elevation toggling linkage of claim 12, wherein the axle comprises a telescoping axle.

15. The elevation toggling linkage of claim 14, wherein the elevation changing link is rotatably mounted to the telescoping axle and comprises a yoke.

16. An elevation toggling linkage for a self-propelled farm implement, the elevation toggling linkage adapted for toggling the self-propelled farm implement between a low ground clearance configuration and a high ground clearance configuration, the elevation toggling linkage comprising:
- an elevation changing link comprising a first axis and a second axis, the elevation changing link comprised by a suspension arrangement connected to a main frame of the self-propelled farm implement;
- a ground link comprising a third axis and a fourth axis, the ground link comprised by a wheel hub mount connected to a wheel hub of the self-propelled farm implement;
- a first connecting link rotatably mounted to the elevation changing link about the first axis and the ground link about the third axis;
- a second connecting link rotatably mounted to the elevation changing link about the second axis and the ground link about the fourth axis;
- the elevation changing link, the ground link, the first connecting link, and the second connecting link comprised by a four-bar linkage of the elevation toggling linkage;
- an actuator transformable between a first configuration and a second configuration, the actuator operably connected to the four-bar linkage, the actuator adapted to raise an elevation of the elevation changing link to a raised elevation and thereby configure the self-propelled farm implement in the high ground clearance configuration when the actuator is transformed from the second configuration to the first configuration and the actuator adapted to lower the elevation of the elevation changing link to a lowered elevation and thereby configure the self-propelled farm implement in the low ground clearance configuration when the actuator is transformed from the first configuration to the second configuration; and
- a first lock that locks the elevation of the elevation changing link to the raised elevation.

17. The elevation toggling linkage of claim 16, further comprising a second lock that locks the elevation of the elevation changing link to the lowered elevation.

* * * * *